(12) United States Patent
Rife et al.

(10) Patent No.: US 7,232,156 B2
(45) Date of Patent: Jun. 19, 2007

(54) VEHICLE FRAME WITH INTEGRATED HIGH PRESSURE FUEL TANK

(75) Inventors: Isaac E Rife, Oak Park, MI (US); Timothy Edmunds, Clinton Township, MI (US); Donald D Anderson, Ann Arbor, MI (US); George Konstantakopoulos, Birmingham, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/420,947

(22) Filed: May 30, 2006

(65) Prior Publication Data

US 2006/0214415 A1 Sep. 28, 2006

Related U.S. Application Data

(62) Division of application No. 10/690,930, filed on Oct. 22, 2003.

(51) Int. Cl.
*B60P 3/22* (2006.01)
(52) U.S. Cl. ..................................... 280/834
(58) Field of Classification Search ................ 280/834, 280/830, 782, 781
See application file for complete search history.

(56) References Cited

U.S. PATENT DOCUMENTS

| | | | |
|---|---|---|---|
| 4,465,254 A | 8/1984 | Murata et al. | |
| 4,486,044 A | 12/1984 | Gordon et al. | |
| 5,370,418 A * | 12/1994 | Pugh | 280/830 |
| 5,385,263 A | 1/1995 | Kirk et al. | |
| 5,443,578 A * | 8/1995 | Davis, Jr. | 280/834 |
| 5,499,739 A | 3/1996 | Greist, III et al. | |
| 5,518,272 A * | 5/1996 | Fukagawa et al. | 280/834 |
| 5,810,309 A | 9/1998 | Augustine et al. | |
| 5,908,077 A | 6/1999 | Moore | |
| 6,042,071 A | 3/2000 | Watanabe et al. | |
| 6,401,963 B1 | 6/2002 | Seal et al. | |
| 6,450,463 B1 | 9/2002 | Mc Cord et al. | |
| 6,481,751 B1 * | 11/2002 | Davis et al. | 280/831 |
| 6,491,882 B1 | 12/2002 | Van Den Berg et al. | |
| 6,536,722 B2 | 3/2003 | Sadowski et al. | |
| 6,565,793 B1 | 5/2003 | Goldsworthy et al. | |
| 6,692,028 B2 * | 2/2004 | Koster | 280/830 |
| 6,827,371 B2 * | 12/2004 | Greil | 280/834 |

* cited by examiner

Primary Examiner—Tony Winner
(74) Attorney, Agent, or Firm—Thomas A. Jurecko

(57) ABSTRACT

A frame for a gaseous fueled vehicle is provided. The frame includes a floor pan, a tunnel positioned centrally and longitudinally in the floor pan extending a full length of the frame, and a tank integrated into the tunnel, where the tank is circular in cross-section and has a variable diameter. The tunnel may also integrate two or more tanks.

10 Claims, 7 Drawing Sheets

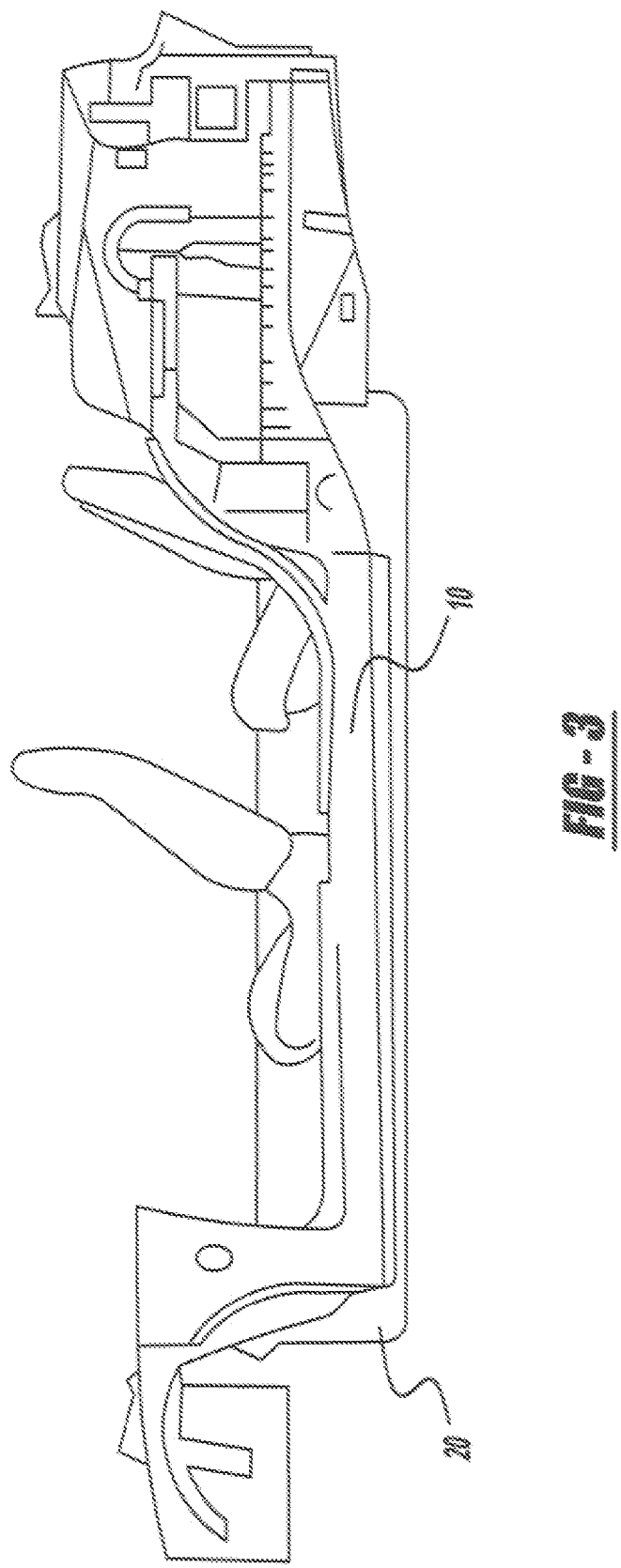

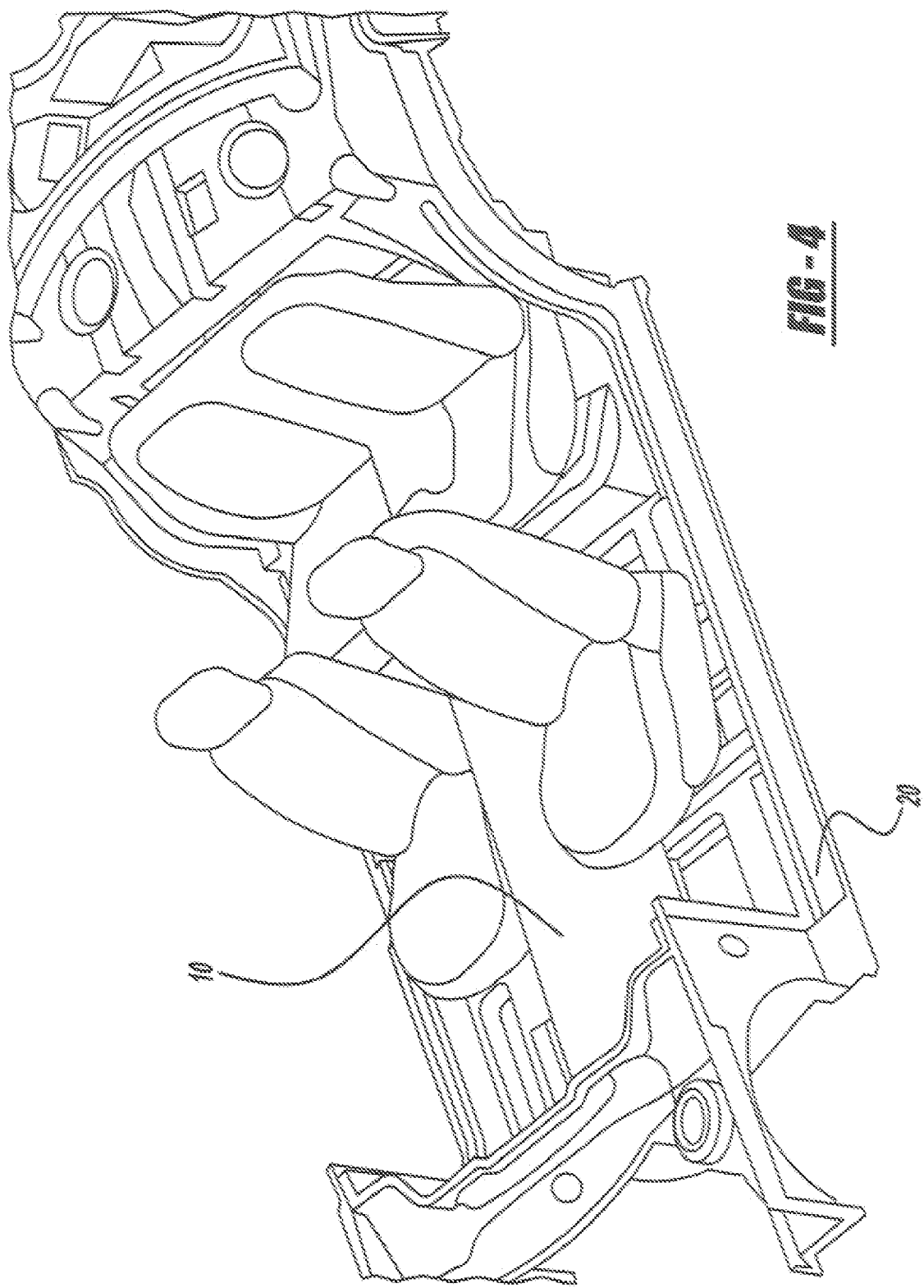

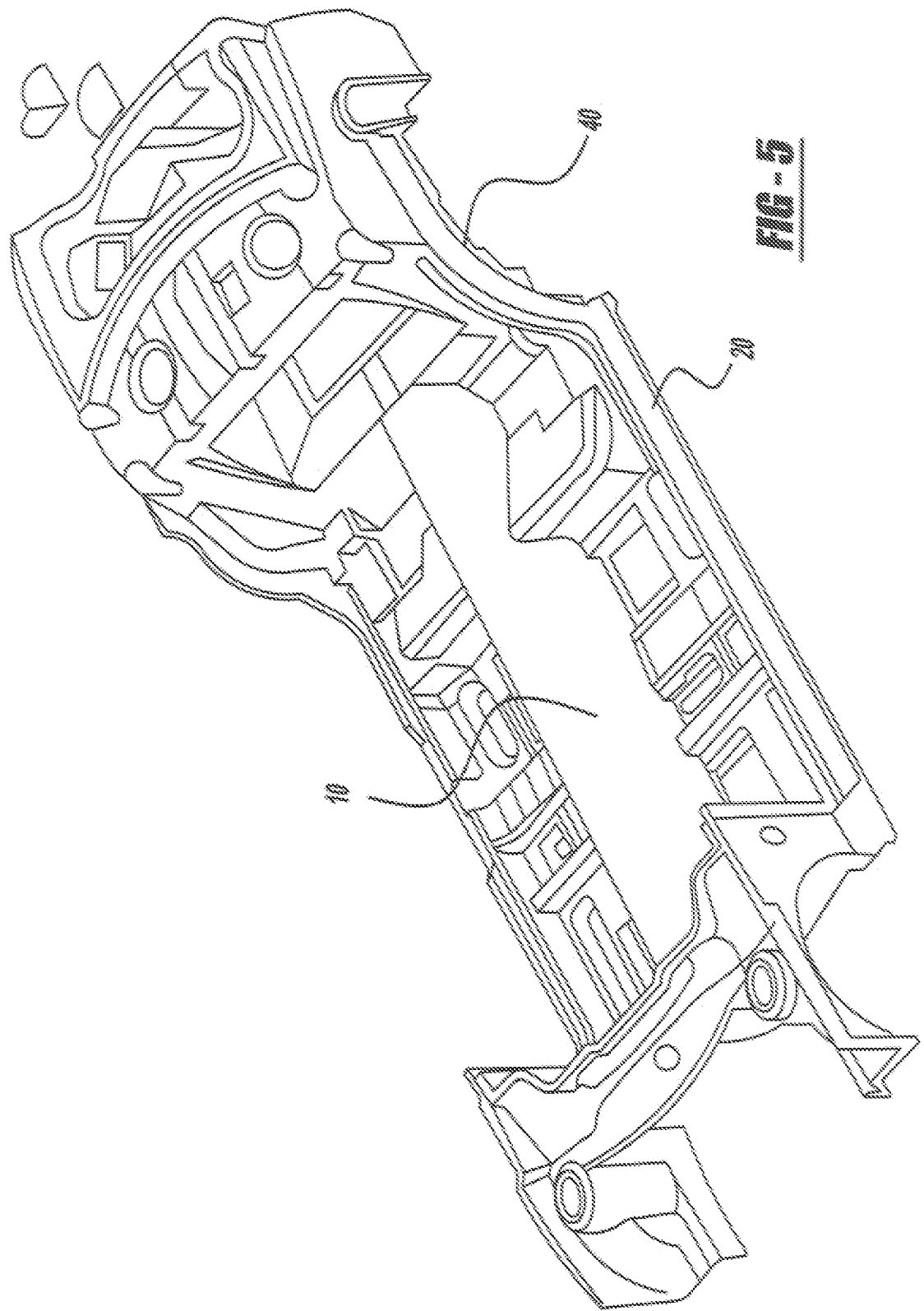

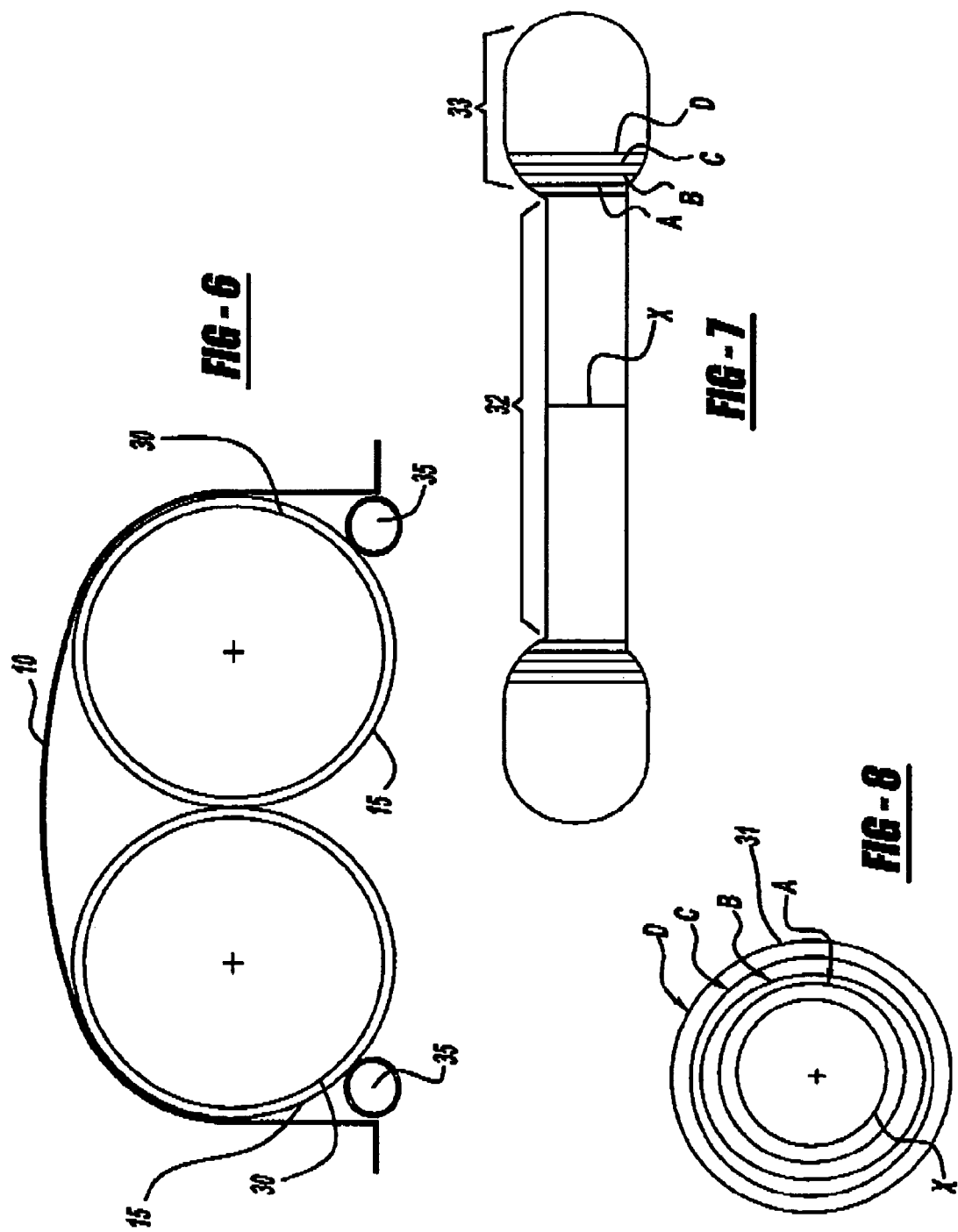

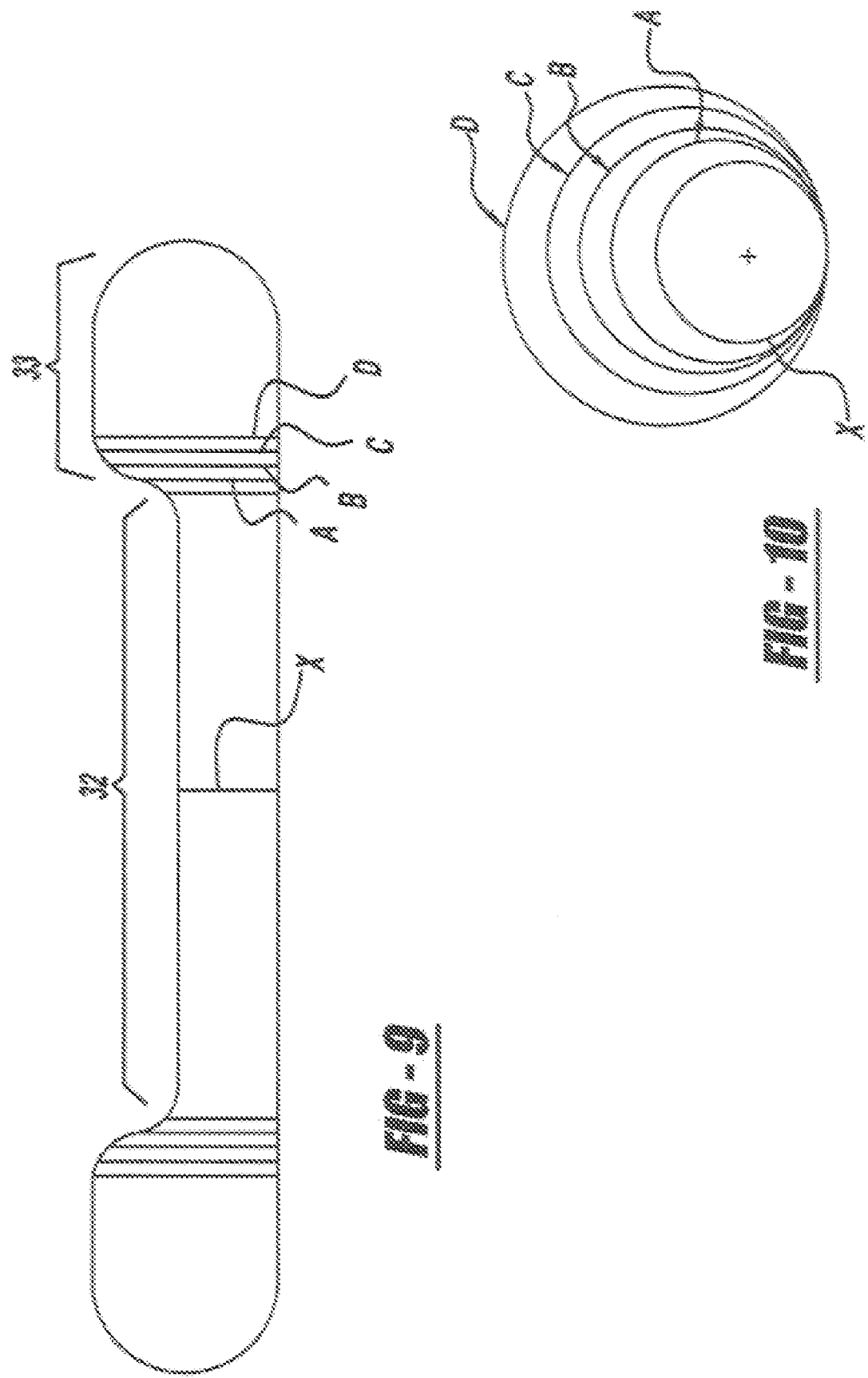

VEHICLE FRAME WITH INTEGRATED HIGH PRESSURE FUEL TANK

CROSS REFERENCE TO RELATED APPLICATION(S)

This is a Divisional Application of U.S. Non-provisional patent application Ser. No. 10/690,930 filed on Oct. 22, 2003, the entire disclosure of which is incorporated by reference herein.

FIELD OF THE INVENTION

The present invention relates generally to vehicles that employ a gaseous fuel such as hydrogen, natural gas, or propane. More particularly, the present invention relates to a vehicle frame having an integrated high pressure fuel tank to accommodate hydrogen, natural gas, propane, etc.

BACKGROUND OF THE INVENTION

The use of hydrogen and other gaseous fuels for vehicles is not new. For example, compressed natural gas (CNG) has occasionally been used as the fuel for internal combustion powered fleet vehicles in markets where CNG represented a low cost, low emission, and relatively high octane fuel source.

The allure of hydrogen as a fuel flows the most basic of chemical formulae: hydrogen plus oxygen equals water. This formula suggests that many of our vehicle related air quality problems could be eliminated simply by fueling future vehicles with hydrogen gas whether they are powered by conventional internal combustion engines, fuel cells, or hybrid fuel cell battery systems.

In general, however, a major problem with gaseous fuels has always been how and where to store such fuel in a vehicle. All gaseous fuel must be compressed to some degree to increase its energy density. Compression by itself requires the use of a reinforced storage tank. Unfortunately, even very high compression does not drastically reduce gaseous fuel volume and a relatively large tank is required if the average vehicle is to have a reasonable driving range between fuel fills. Thus, using gaseous fuel on a vehicle requires using a relatively large, reinforced tank.

In the past, the use of gaseous fuels has typically been limited to larger vehicles, such as trucks, due in part to the relatively large size of the fuel tanks necessary to provide fuel to power the vehicle over an acceptable range. Such tanks are described in U.S. Pat. No. 5,810,309 (mounting assembly for retrofitting a CNG tank to an existing vehicle by cutting part of the frame); U.S. Pat. No. 6,042,071 (mounting assembly for a large CNG tank that takes over the trunk compartment and accommodates expansion and contraction of the tank); and U.S. Pat. No. 6,536,722 (rack for mounting a number of CNG tanks such as on a bus).

Hybrid vehicles that combine gaseous fueled engines or fuel cells with batteries and electric motors are currently under development. These hybrids are designed with a hydrogen tank in the trunk similar to that described in U.S. Pat. No. 6,536,722.

Current tank designs for compressed gaseous fuel have a number of drawbacks. For example, gaseous fuel tanks are almost too large to be used in compact vehicles. In mid to full size passenger cars, gaseous fuel tanks require almost all the space in the trunk. In small trucks, part of the cargo area must be used to accommodate a gaseous fuel tank. The problem of accommodating a compressed gas tank is exacerbated in a hybrid vehicle where available storage space is frequently limited by the other systems present.

SUMMARY OF THE INVENTION

One object of the present invention is an improved gaseous fuel tank.

Another object of the present invention is an improved gaseous fuel tank that is integrated into the vehicle frame such that cargo space is available.

Still another object of the present invention is an integrated gaseous fuel tank that provides adequate storage for gaseous hydrogen in a hydrogen hybrid vehicle.

These and other objects of the invention are satisfied by a frame for a gaseous fueled vehicle, the frame comprising: a floor pan, a tunnel positioned centrally and longitudinally in the floor pan extending the full length of the frame, and a tank integrated into and extending the full length of the tunnel, where the tank is circular in cross-section and has a variable diameter.

These objects are also satisfied by a frame for a gaseous fueled hybrid vehicle, the frame comprising: a floor pan, a tunnel positioned centrally and longitudinally in the floor pan extending the full length of the frame, and at least two tanks integrated into the tunnel, where the at least two tanks are circular in cross-section and each has a variable diameter.

BRIEF DESCRIPTION OF THE DRAWINGS

FIG. 3 is a cross section of a vehicle frame showing the positioning of the tunnel.

FIG. 4 is a perspective view of a vehicle frame showing positioning of the tunnel between the seats.

FIG. 5 is a perspective view of showing integration of a tunnel in a vehicle frame.

FIG. 6 schematically shown is a cross section of a tunnel showing positioning of integrated tanks as well as accessory tubes.

FIG. 7 is a longitudinal cross section of a variable diameter tank where the variations are uniform about the tank's center line.

FIG. 8 is a cross section of the variable diameter tank of FIG. 7.

FIG. 9 is a longitudinal cross section of a variable diameter tank where the variations are offset relative to the tank's center line.

FIG. 10 is a cross section of the variable diameter tank of FIG. 9.

DESCRIPTION OF THE INVENTION

A vehicle frame having an integrated high pressure fuel tank or tanks of the present invention can be accomplished with either a production floor pan or a second floor pan that has a large central tunnel. This tunnel is packaged around a high pressure hydrogen gas or compressed natural gas tank longitudinally mounted the length of the frame. The precise sizing and configuration of the tunnel is based on the shape and configuration of the high pressure tank because the tank has the least package flexibility. Additionally, the design and configuration of the tunnel must accommodate the expansion and contraction of the contained tank. (As used herein, the term "tank" is intended to refer to the use of a single or multiple tanks.)

A vehicle employing the present invention may be fueled with hydrogen gas, natural gas, propane, or other gaseous fuel. Such a vehicle may be configured with an internal combustion engine or other type of fueled engine that burns gaseous fuel. Alternatively, the vehicle could be configured to utilize a fuel cell stack to reform the gaseous fuel and generate electricity to power an electric motor or motors. Another vehicle configuration that may use the present invention is a hybrid electric vehicle configured with a fueled engine, electric motor(s), and batteries; or a fuel cell, electric motor(s) and batteries.

The high pressure tank of the present invention is designed to safely contain gas at pressures of 10,000 psi or more. Such pressures dictate that the tanks must be cylinders or spheres or a combination thereof. Representative high pressure tanks are described for example in U.S. Pat. Nos. 5,385,263, 5,499,739, 6,401,963, 6,491,882, 6,565,793, the contents of which are specifically incorporated herein by reference. These tanks typically involve a cylinder of metal or plastic wrapped with layers of wound fibers of glass or carbon fiber, for example. Often referred to as composite overwrapped pressure vessels, such reinforced tanks are continually being improved. The present invention is specifically intended to cover the use of ever improving pressure vessels or tanks that will be capable of containing gas at ever increasing pressures.

Of additional consideration in formulating the size and shape of the tunnel is the engine(s) (e.g. conbustion engine, fuel cell, hybrid, etc.) and power train in use (e.g. front or rear wheel drive with automatic or manual transmission), as well as the kind and location of additional equipment (e.g. spare tire, crash protection, trunk space, styling, etc.). The length of the tank is determined by the distance between the front console and the rear of the vehicle as adjusted by the vehicle equipment and layout (e.g. power train, spare tire, trunk, styling, etc.) that need to be accommodated.

Figure 1:
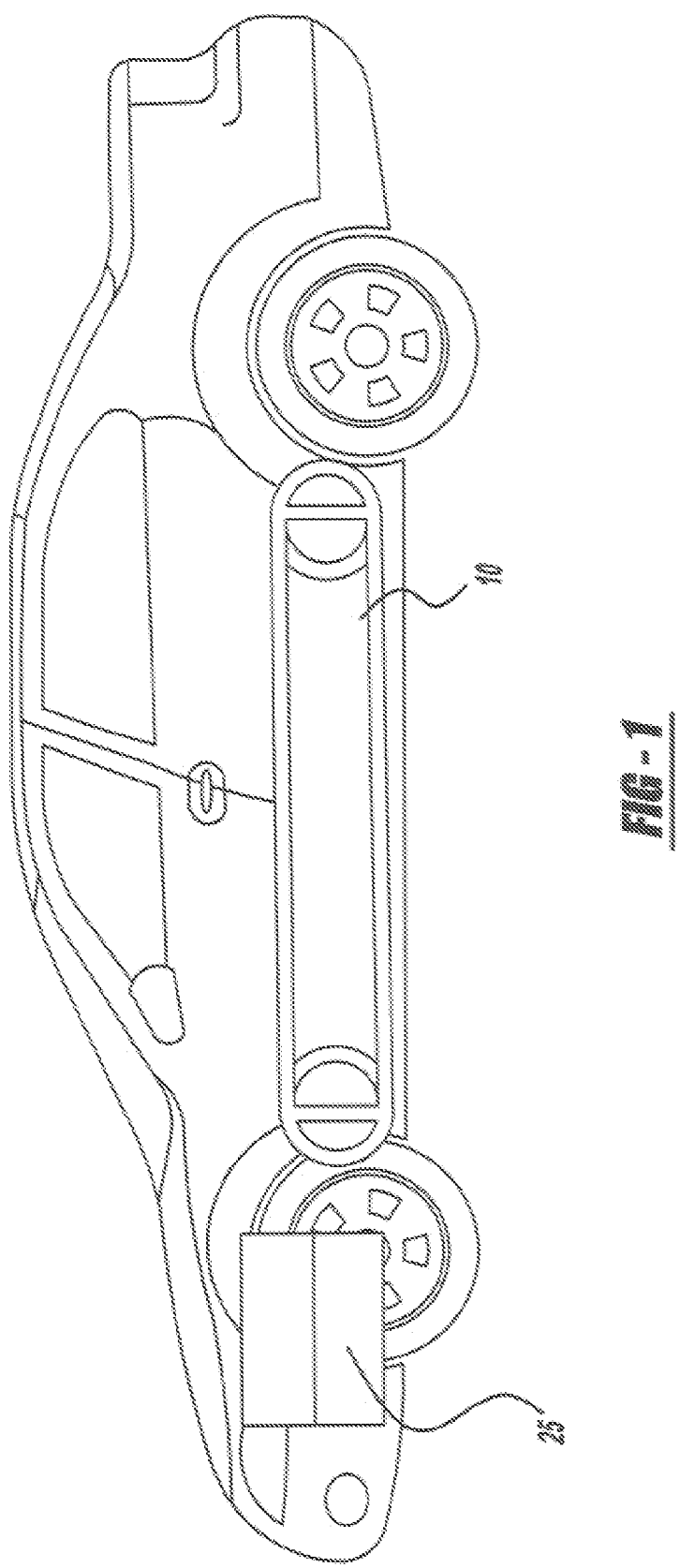
FIG. 1 is a cross section of a vehicle showing a centrally positioned tunnel according to the invention.
Figure 2:
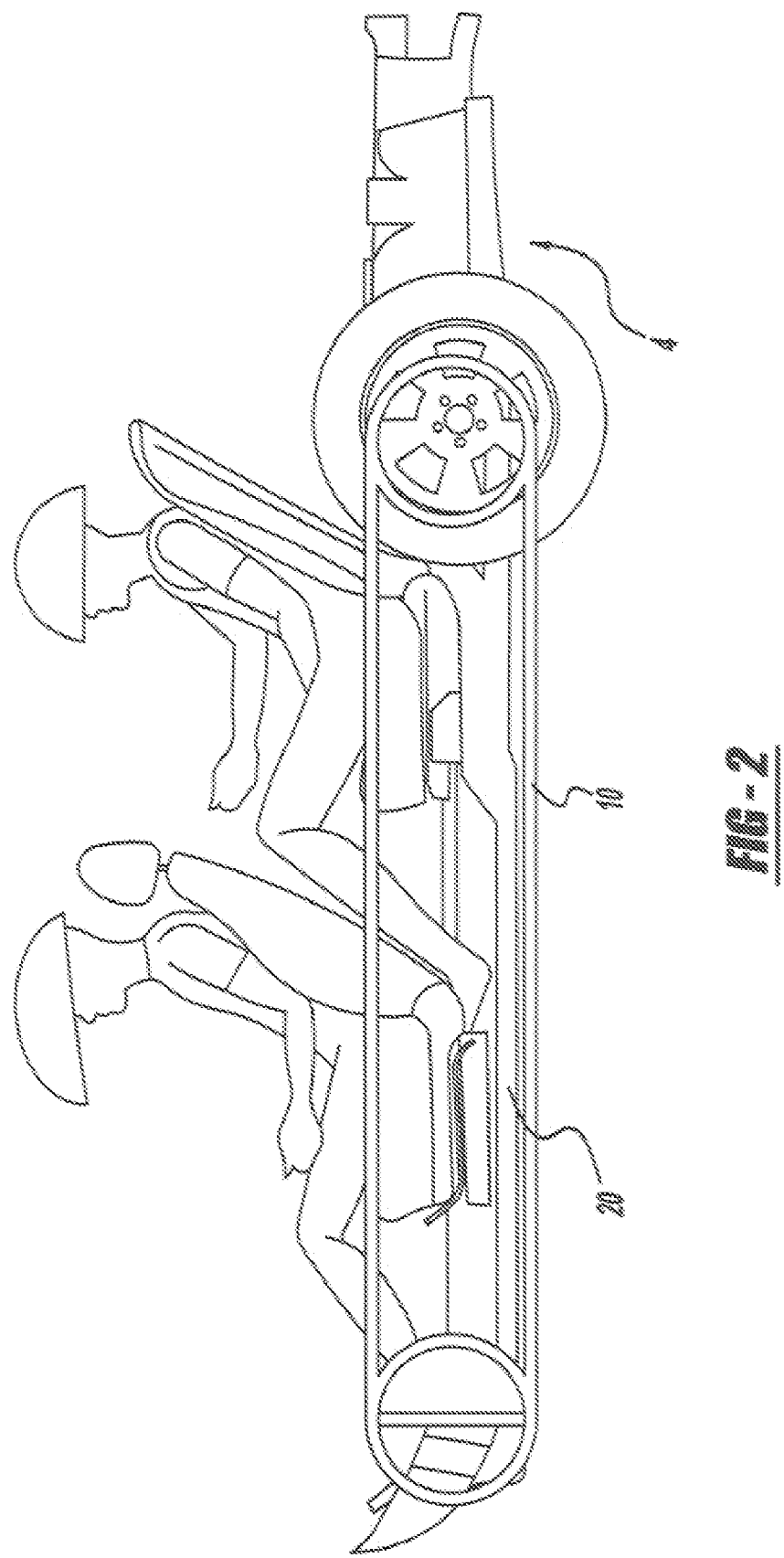
FIG. 2 is a cross section of a vehicle frame showing positioning of the tunnel in relation to the passengers.

If a single tank is used, the length of available space in the tunnel for the tank and the size of the tank (based on the desired range of the vehicle, pressure or the fuel in the tank, etc.) dictates the diameter of the tank, which dictates the effective diameter of the tunnel. For example, using currently technology, for reasonably viable fuel economies for hydrogen gas in a midsized sedan, the tank would be about 400 mm in diameter and 2000–2500 mm in length. The approximate sizing and positioning of such a tank is illustrated in FIGS. 1 and 2.

A less obvious benefit of a vehicle frame having an integrated high pressure fuel tank is the larger tunnel dictated by the tank increases the chassis' stiffness. This increase in chassis stiffness increases both bending stiffness and torsional stiffness and makes a significant contribution to vehicle handling.

Another advantage is that in a traditional five passenger sedan using the invention, the amount of hip room in the front seats and the rear seats directly behind them is only slightly reduced. See FIGS. 3, 4, and 5. Obviously, the larger diameter tunnel in the present invention would reduce the foot space in the center rear seat. However, since this seat is often occupied by a child or a child sitting on a booster seat or a child safety seat, the overall operational impact is negligible.

The engine compartment 25 in a vehicle employing the present invention is flexible enough to handle laterally and longitudinally mounted engines or motors and/or a fuel cell stack. Engines and fuel cells that use hydrogen, natural gas, propane, etc. work well with the present invention. For hybrid vehicle applications, since the engine, electric motor (s), and fuel cell are reduced in size they are easily mounted in the engine compartment. Also in hybrid vehicle applications, batteries may be distributed in locations throughout the vehicle or the size or length of the tank may be reduced and all or part of the battery pack may be positioned in the tunnel. (Possible configurations of a battery pack in the tunnel are described in U.S. Pat. No. 5,908,077, the contents of which are specifically incorporated herein by reference.)

The present invention is also adaptable to use either traditional or hybrid transmissions or combinations thereof. For example the present invention easily accommodates traditional front wheel drive, four wheel drive, and all wheel drive powertrains as well as hybrid systems that employ, for example, a traditional front wheel drive transaxle and direct drive electric motors on each rear wheel, direct drive electric motors only, a traditional transaxle and an electric motor, etc.

As illustrated in FIG. 6, a number of components 35 for the various intended configurations can easily be configured with tanks 30 under the tunnel 10. The components 35 may be conduits for exhaust, a prop shaft running from the engine to the rear wheels, heating and/or cooling conduits (useful for example in raising and lowering the temperature of tanks 30 if it contains a hydrogen storage material that releases hydrogen gas upon heating, or for cooling very high pressure tanks when the ambient temperature is very high), etc. It is intended that the size of the components 35 and tanks 30 may be varied as desired. For example and referring to FIG. 6, the diameter of the components 35 may be increased and the diameter of tanks 30 decreased if using four equally sized tanks was more desirable.

Also illustrated in FIG. 6 are rubber expansion springs 15. The expansion springs 15 serve to support and fix the tanks 30 in the tunnel 10 while simultaneously providing for the expansive deformation of tanks 30.

FIGS. 7–10 illustrate multi-diameter, dumbbell shaped tanks 31 that otter increased storage capacity compared to conventional cylindrical tanks 30. FIGS. 7 and 8 illustrate a multi-diameter, common axis tank and FIGS. 9 and 10 illustrate a multi-diameter offset axis tank, each having diameters A, B, C, and D, each of which is greater than the diameter X of the main body 32 of the tank. The advantage of this dumbbell configuration is that the main body 32 can dictate the size of the tank tunnel 10 rather than the dumbbell ends 33. In addition and referring to FIG. 6 in connection with FIGS. 7–10, each of the cylindrical tanks 30 shown positioned under tunnel 10 in FIG. 6 can be a multi-diameter tank 31 as shown in FIGS. 7–8 with a common axis or as shown in FIGS. 9–10 with an offset axis.

A preferred embodiment of the present invention is a frame 40 for a hybrid fuel cell electric vehicle fueled with hydrogen gas where the vehicle comprises a fuel cell stack, storage batteries, and at least one electric motor. The frame includes a floor pan 20 and a tunnel 10 positioned centrally and longitudinally in the floor pan, where the tunnel extends the full length of the frame. The hydrogen gas is stored in a single tank 30 that is integrated into and extends the full length of the tunnel 10. Such a hybrid vehicle reforms (oxidizes) the hydrogen to produce an electric current which directly powers the electric motor or is stored in the batteries. The batteries may also be charged via regenerative braking and other energy recapture techniques. The tank 30 is axially disposed in the tunnel 10 and circular in cross-section. The tank may be a multi-diameter tank 31 (i.e. have end portions 33 that are larger in cross-sectional area than the central area 32) having a common axis Q (i.e. have the terminal ends and the central area centered about the same longitudinal axis Q); or an offset axis R (i.e. have the terminal ends and the central area each centered on different axes that are offset from each other).

Although the invention has been described with reference to specific embodiments thereof, the forms of the invention shown and described are a non-limiting embodiment and various changes and modifications, such as described herein as well those that are obvious to those skilled in the art, may by made without departing from the spirit and scope of the invention as defined in the Claims below.

The invention claimed is:

1. A frame for a gaseous fueled vehicle, said frame comprising:
    a floor pan;
    a tunnel positioned centrally and longitudinally in said floor pan, extending the full length of said frame; and
    a tank integrated with and extending the full length of said tunnel, where said tank has terminal ends and a central area and said terminal ends have a larger cross-sectional area than said central area.

2. The frame described in claim 1, where said tank is a high pressure hydrogen storage tank.

3. The frame described in claim 1, where said tank is a compressed natural gas tank.

4. The frame described in claim 1, where said tank has a longitudinal axis and said terminal ends and said central area are centered about said longitudinal axis.

5. The frame described in claim 1, where said tank has a longitudinal axis and said central area is centered about said longitudinal axis and said terminal ends are offset from said longitudinal axis.

6. A frame for a gaseous fueled hybrid vehicle, said frame comprising:
    a floor pan;
    a tunnel positioned centrally and longitudinally in said floor pan, extending the full length of said frame; and
    at least two tanks integrated into said tunnel, where each of said at least two tanks has terminal ends and a central area and said terminal ends of each have a larger cross-sectional area than said central area of each.

7. The frame described in claim 6, where said at least two tanks are high pressure hydrogen storage tanks.

8. The frame described in claim 6, where said at least two tanks are compressed natural gas tanks.

9. The frame described in claim 6, where each of said tanks has a longitudinal axis and said terminal ends of each and said central area of each are centered about said longitudinal axis.

10. The frame described in claim 6, where each of said tanks has a longitudinal axis and said central area of each is centered about said longitudinal axis and said terminal ends of each are offset from said longitudinal axis.

* * * * *